US011333078B2

United States Patent
Nayak et al.

(10) Patent No.: US 11,333,078 B2
(45) Date of Patent: May 17, 2022

(54) AIR TURBINE STARTER WITH DECOUPLER

(71) Applicant: GE AVIATION SYSTEMS LLC, Grand Rapids, MI (US)

(72) Inventors: Subrata Nayak, Bangalore (IN); Pallavi Tripathi, Bangalore (IN); David Raju Yamarthi, Bangalore (IN); Navin Soni, Bangalore (IN); Dhiraj Thakare, Bangalore (IN); Shiloh Montegomery Emerson Meyers, Dayton, OH (US); David Allan Dranschak, Union, OH (US)

(73) Assignee: GE Aviation Systems LLC, Grand Rapids, MI (US)

( * ) Notice: Subject to any disclaimer, the term of this patent is extended or adjusted under 35 U.S.C. 154(b) by 269 days.

(21) Appl. No.: 16/469,204

(22) PCT Filed: Oct. 30, 2017

(86) PCT No.: PCT/US2017/058925
§ 371 (c)(1),
(2) Date: Jun. 13, 2019

(87) PCT Pub. No.: WO2018/111422
PCT Pub. Date: Jun. 21, 2018

(65) Prior Publication Data
US 2019/0331029 A1   Oct. 31, 2019

(30) Foreign Application Priority Data

Dec. 15, 2016 (IN) .............................. 201641042868

(51) Int. Cl.
*F02C 7/36* (2006.01)
*F02C 7/277* (2006.01)
(Continued)

(52) U.S. Cl.
CPC ................ *F02C 7/36* (2013.01); *F02C 7/277* (2013.01); *F16D 9/06* (2013.01); *F16D 27/01* (2013.01);
(Continued)

(58) Field of Classification Search
CPC ....................................................... F16D 27/01
See application file for complete search history.

(56) References Cited

U.S. PATENT DOCUMENTS 2,908,170 A   10/1959   Schindel et al.
3,280,352 A   10/1966   Chapman
(Continued)

FOREIGN PATENT DOCUMENTS

CA   2676586 C    9/2014
CA   2894788 A1   12/2015
(Continued)

OTHER PUBLICATIONS

Intellectual Property India; Examination Report in Application No. 201641042868; dated Jul. 18, 2019; 7 pages; Guindy, Chennai.
(Continued)

*Primary Examiner* — Juan G Flores
(74) *Attorney, Agent, or Firm* — McGarry Bair PC

(57) ABSTRACT

A method and decoupler for disengaging an output shaft from an engine in a back drive event with a backdrive decoupler. The backdrive decoupler includes an output shaft, drive shaft wherein the output shaft is selectively coupled to the drive shaft. Permanent magnets are used to transmit torque from the drive shaft to the output shaft. In a backdrive event, the decoupler decouples the output shaft from the drive shaft by uncoupling the torque transfer.

20 Claims, 11 Drawing Sheets

(51) Int. Cl.
*F16D 9/06* (2006.01)
*F16D 27/01* (2006.01)

(52) U.S. Cl.
CPC *F05D 2260/311* (2013.01); *F05D 2260/4041* (2013.01)

(56) References Cited

U.S. PATENT DOCUMENTS

| | | | |
|---|---|---|---|
| 4,151,431 A | | 4/1979 | Johnson |
| 4,350,236 A | | 9/1982 | Stahlhuth |
| 4,572,343 A | | 2/1986 | Boffelli |
| 4,871,296 A | | 10/1989 | Laessle et al. |
| 5,366,412 A | * | 11/1994 | Beaty .................. A61C 8/0089 433/173 |
| 5,839,318 A | | 11/1998 | Kimura et al. |
| 6,059,085 A | | 5/2000 | Farnsworth |
| 6,681,579 B2 | * | 1/2004 | Lane .................. F02C 7/277 60/787 |
| 7,728,477 B2 | | 6/2010 | Birdi et al. |
| 7,791,235 B2 | | 9/2010 | Kern et al. |
| 8,105,018 B2 | | 1/2012 | Gockel et al. |
| 8,857,192 B2 | | 10/2014 | Huang et al. |
| 9,334,905 B2 | * | 5/2016 | Mankame .............. F16D 23/02 |
| 10,381,889 B2 | | 8/2019 | Joshi et al. |
| 2004/0113507 A1 | | 6/2004 | Yoda et al. |
| 2009/0199567 A1 | | 8/2009 | Gockel et al. |
| 2012/0159964 A1 | | 6/2012 | Huang et al. |
| 2013/0064688 A1 | | 3/2013 | Walitzki et al. |
| 2015/0128592 A1 | | 5/2015 | Filiputti et al. |
| 2016/0006335 A1 | | 1/2016 | Ohhashi et al. |
| 2016/0047319 A1 | | 2/2016 | Gieras et al. |

FOREIGN PATENT DOCUMENTS

| | | |
|---|---|---|
| CN | 1137608 A | 12/1996 |
| CN | 101389841 A | 3/2009 |
| CN | 101749095 A | 6/2010 |
| CN | 102022486 A | 4/2011 |
| CN | 102235246 A | 11/2011 |
| CN | 10232482 A | 1/2012 |
| CN | 104884748 A | 9/2015 |
| CN | 104919219 A | 9/2015 |
| CN | 105003342 A | 10/2015 |
| CN | 105156216 A | 12/2015 |
| DE | 3415427 A1 | 10/1984 |
| GB | 784268 A | 10/1957 |
| KR | 20150003189 A | 1/2015 |
| WO | 2014065811 A1 | 8/2004 |
| WO | 2007003052 A1 | 1/2007 |
| WO | 2008122861 A1 | 10/2008 |

OTHER PUBLICATIONS

European Patent Office, Extended Search Report re Corresponding Application No. 178813253.9-1007, dated Jul. 14, 2020, 6 pages, Munich, Germany.

PCT International Search Report and Written Opinion of the International Searching Authority for PCT/US2017/058925, dated Apr. 25, 2018.

* cited by examiner

AIR TURBINE STARTER WITH DECOUPLER

CROSS REFERENCE TO RELATED APPLICATIONS

This application is a National Phase application of International Application No. PCT/US2017/058925, filed on Oct. 30, 2017, which claims the benefit of IN Application No. 201641042868, filed Dec. 15, 2016, both which are incorporated herein in in their entireties.

BACKGROUND OF THE INVENTION

A driving mechanism, such as a motor or engine, can generate driving motions at a mechanism output, such as at a rotatable output shaft. The output shaft can, for example, provide a rotational kinetic motion to another piece of equipment via a rotatable drive shaft connected to the output shaft. The piece of equipment receiving the rotational kinetic motion can utilize the driving rotational motion as an energy source to operate. In one example configuration, a gas turbine engine, also known as a combustion turbine engine, is a rotary engine that extracts energy from a flow of combusted gases passing through the engine onto a multitude of turbine blades. The gas turbine engine can provide at least a portion of the rotational kinetic motion to rotating equipment, such as an accessory gearbox, where the rotational motion is utilized to power a number of different accessories. The accessories can include generators, starter/generators, permanent magnet alternators (PMA) or permanent magnet generators (PMG), fuel pumps, and hydraulic pumps. In the event of failure of the driving mechanism, it can be desirable to decouple the driving mechanism from the rotating equipment.

BRIEF DESCRIPTION OF THE INVENTION

In one aspect, the present disclosure relates to an air turbine starter for starting an engine, comprising a housing defining an inlet, an outlet, and a flow path extending between the inlet and the outlet for communicating a flow of gas there through, a turbine member journaled within the housing and disposed within the flow path for rotatably extracting mechanical power from the flow of gas, a gear train drivingly coupled with the turbine member, a clutch having a drive shaft that is operably coupled with the gear train, an output shaft configured to be operably coupled to and rotate with the engine, and a backdrive decoupler, comprising a first set of magnets operably coupled to the drive shaft, a second set of magnets, operably coupled to the output shaft, and a member moveable between a first position and a second position wherein the member breaks the flux between the first set of magnets and the second set of magnets, wherein driving torque is transmitted from the drive shaft of the clutch to the output shaft through a magnetic flux created between the first set of magnets and the second set of magnets, when overrunning torque is transmitted the member moves to the second position and is configured to break the magnetic flux between drive shaft and output shaft thereby uncoupling torque transfer between the drive shaft and the output shaft to define a decoupled position where the output shaft is disengaged from the gear train.

In another aspect, a decoupler assembly for decoupling an output shaft from a drive shaft during backdrive, comprising a first set of magnets operably coupled to the drive shaft, a second set of magnets, opposite in polarity to the first set of magnets, operably coupled to the output shaft, and a member moveable between a first position and a second position wherein the member decoupled the flux between the first set of magnets and the second set of magnets, wherein driving torque is transmitted from the drive shaft of the clutch to the output shaft through magnetic flux created by the first set of magnets and second set of magnets, when overrunning torque is transmitted the member moves to the second position and is configured to break a magnetic dipole between drive shaft and output shaft by redirecting the magnetic field lines uncoupling torque transfer between the drive shaft and the output shaft to define a decoupled position where the output shaft is disengaged from the gear train.

In yet another aspect, the present disclosure relates to a method for operating an air turbine starter, comprising extracting mechanical power from a flow of gas utilizing a turbine and driving a gear train and clutch having a drive shaft with a first set of magnets operably coupled thereto therewith, transferring a driving torque from the drive shaft to an output shaft having a second set of magnets, opposite in polarity to the first set of magnets, operably coupled to the output shaft, and where the output shaft is operably coupled to an engine, and during back driving moving a member to a position wherein the member decouples a magnetic flux between the first set of magnets and the second set of magnets, wherein driving torque is transmitted from the drive shaft of the clutch to the output shaft through magnetic flux created by the first set of magnets and second set of magnets, when overrunning torque is transmitted the member moves to the second position and is configured to weaken a magnetic dipole between drive shaft and output shaft by redirecting the magnetic field lines uncoupling torque transfer between the drive shaft and the output shaft to define a decoupled position where the output shaft is disengaged from the gear train.

DETAILED DESCRIPTION OF THE EMBODIMENTS

The present disclosure is related to a driving mechanism generating kinetic motion in the form of a rotating shaft coupled with a piece of rotating equipment. One non-limiting example of a driving mechanism can include a gas turbine engine rotationally driving a piece of rotating equipment, such as a starter. The starter has various applications including starting a gas turbine engine and generating electrical power when the gas turbine engine is in operation. While the exemplary embodiment described herein is directed to application of a gas turbine engine and a starter, embodiments of the disclosure can be applied to any implementation of a driving mechanism that generates rotational motion at a driving output, and provides the rotational motion to another piece of rotating equipment.

Figure 1:
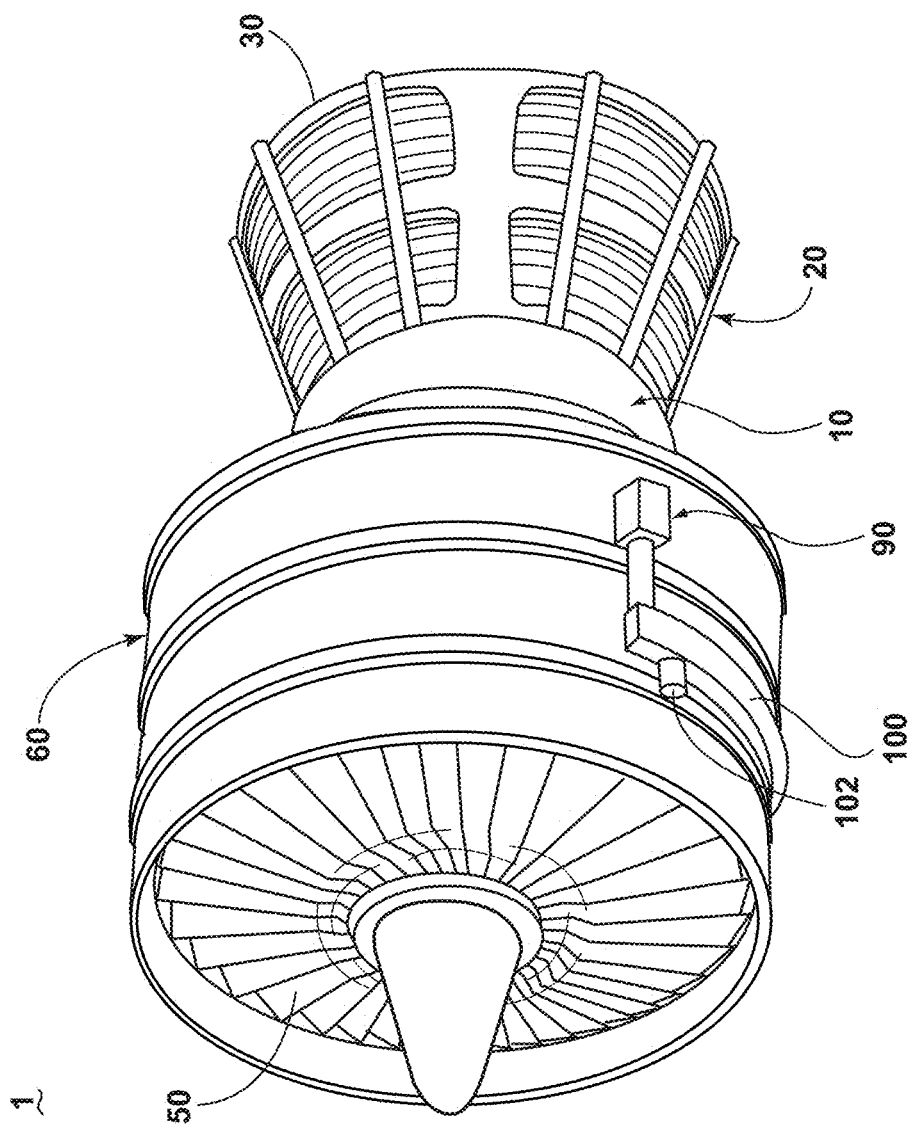
FIG. 1 is a schematic illustration of a gas turbine engine with an accessory gearbox in accordance with various aspects described herein.

Referring to FIG. 1, a starter motor or air turbine starter 102 comprising an accessory gear box (AGB) 100, also known as a transmission housing, are schematically illustrated as being mounted to a gas turbine engine 1. This assembly is commonly referred to as an Integrated Starter/Generator Gearbox (ISGB), or simply an air turbine starter. The gas turbine engine 1 comprises an air intake with a fan 50 that supplies air to a high pressure compression region 60. The air intake with a fan 50 and the high pressure compression region collectively are known as the 'cold section' of the gas turbine engine upstream of the combustion. The high pressure compression region 60 provides the combustion chamber 10 with high pressure air. In the combustion chamber, the high pressure air is mixed with fuel and combusted. The hot and pressurized combusted gas passes through a high pressure turbine region 20 and a low pressure turbine region 30 before exhausting from the gas turbine engine. As the pressurized gases pass through the high pressure turbine (not shown) of the high pressure turbine region 20 and the low pressure turbine (not shown) of the low pressure turbine region 30, the turbines extract rotational energy from the flow of the gases passing through the gas turbine engine 1. The high pressure turbine of the high pressure turbine region 20 can be coupled to the compression mechanism (not shown) of the high pressure compression region 60 by way of a shaft to power the compression mechanism. The low pressure turbine can be coupled to the fan 50 of the air intake by way of a shaft to power the fan 50.

The gas turbine engine can be a turbofan engine, such as a General Electric GEnx or CF6 series engine, commonly used in modern commercial and military aviation or it could be a variety of other known gas turbine engines such as a turboprop or turboshaft. The gas turbine engine can also have an afterburner that burns an additional amount of fuel downstream of the low pressure turbine region 30 to increase the velocity of the exhausted gases, and thereby increasing thrust.

The AGB 100 is coupled to a turbine shaft of the gas turbine engine 1, either to the low pressure or high pressure turbine by way of a mechanical power take-off 90. The mechanical power take off 90 contains multiple gears and means for mechanical coupling of the AGB 100 to the gas turbine engine 1. The air turbine starter 102 can be mounted on the outside of either the air intake region containing the fan 50 or on the core near the high pressure compression region 60.

Figure 2:
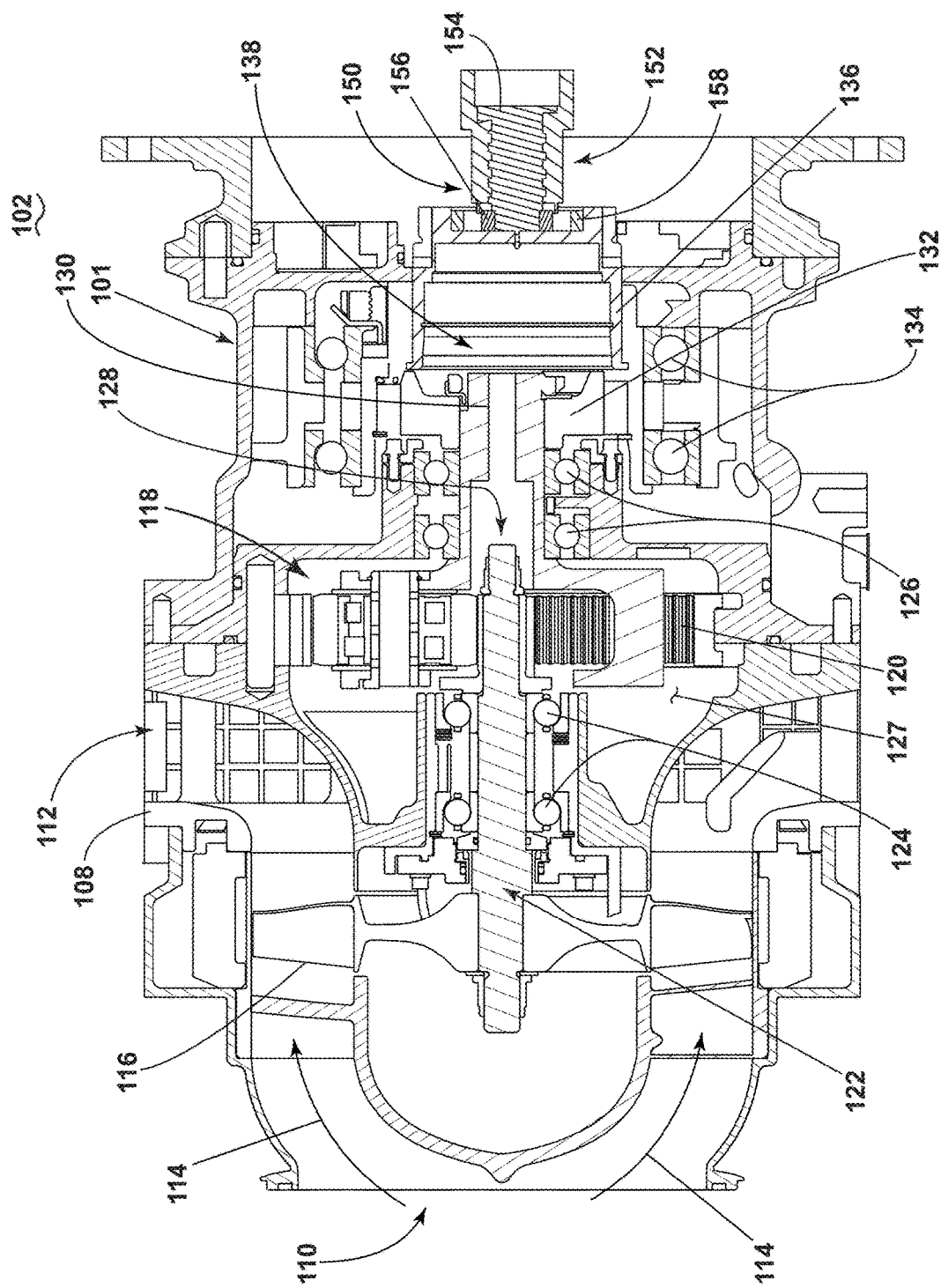
FIG. 2 is a sectional view of a starter/generator mounted to the accessory gearbox of FIG. 1 by way of a rotating shaft, in accordance with various aspects described herein.

Referring now to FIG. 2, the air turbine starter 102 is shown in greater detail. Generally, the air turbine starter 102 includes a housing 108 defining an inlet 110, an outlet 112, and a flow path 114 extending between the inlet 110 and outlet 112 for communicating a flow of gas therethrough. The air turbine starter 102 includes a turbine member 116 journaled within the housing 108 and disposed within the flow path 114 for rotatably extracting mechanical power from the flow of gas along the flow path 114. Further, a gear train 118, disposed within a gear box 101 and drivingly coupled with the turbine member 116, can be caused to rotate.

The gear train 118 includes a ring gear 120 and can further comprise any gear assembly including for example but not limited to a planetary gear assembly or a pinion gear assembly. A turbine shaft 122 couples the gear train 118 to the turbine member 116 allowing for the transfer of mechanical power. The turbine shaft 122 is rotatably mounted to the gear train 118 and supported by a pair of turbine bearings 124 while the gear train 118 is supported by a pair of carrier bearings 126.

A gear box interior 127 can contain oil to provide lubrication and cooling to mechanical parts contained therein such as the gear train 118, ring gear 120, and bearings 124, 126.

There is an aperture 128 through which the turbine shaft 122 extends and meshes with a carrier shaft 130 to which a clutch 132 is mounted and supported by a pair of spaced bearings 134. A drive shaft 136 extends from a portion of the gear box 101 and is coupled to the clutch 132 and additionally supported by the pair of spaced bearings 134. The drive shaft 136 is driven by the gear train 118 and coupled to the power take-off 90 of the gas turbine engine 1, such that operation of the engine 1 provides a driving motion to the gear box 101.

The clutch 132 can be any type of shaft interface portion that forms a single rotatable shaft 138 comprising the turbine shaft 122, the carrier shaft 130, and the drive shaft 136. The shaft interface portion can be by any known method of coupling including, but not limited to, gears, splines, a clutch mechanism, or combinations thereof. An example of a shaft interface portion 132 is disclosed in U.S. Pat. No. 4,281,942 to General Electric and is incorporated herein by reference in its entirety.

The gear box 101 and the starter 102 can be formed by any known materials and methods, including, but not limited to, die-casting of high strength and lightweight metals such as aluminum, stainless steel, iron, or titanium. The housing for the gear box 101 and starter 102 can be formed with a thickness sufficient to provide adequate mechanical rigidity without adding unnecessary weight to the air turbine starter 102 and, therefore, the aircraft.

The rotatable shaft 138 can be constructed by any known materials and methods, including, but not limited to extrusion or machining of high strength metal alloys such as those containing aluminum, iron, nickel, chromium, titanium, tungsten, vanadium, or molybdenum. The diameter of the turbine shaft 122, carrier shaft 130, and drive shaft 136 can be fixed or vary along the length of the rotatable shaft 138. The diameter can vary to accommodate different sizes, as well as rotor to stator spacings.

As described herein, either the gear box 101 or the starter 102 can be a driving mechanism for driving the rotation of the rotating shafts 122, 130, 136. For example, during starting operations, the starter 102 can be the driving mechanism for rotation of the rotating shafts 122, 130, 136. Alternatively, during normal gas turbine engine 1 operation, the gear box 101 can be the driving mechanism for rotation of the rotating shafts 122, 130, 136. The non-driving mechanism, that is, the equipment being driven by the driving mechanism, can be understood as rotating equipment utilizing the rotational movement of the rotating shafts 122, 130, 136, for example to generate electricity in the starter 102.

The drive shaft 136 is further coupled to a decoupler assembly 150 including a backdrive decoupler 152 having an output shaft 154, configured to be operably coupled to and rotate with the engine 1, with a first set of magnets 156 coupled to the drive shaft 136 and a second set of magnets 158 coupled to the output shaft 154. A threaded shaft 178 is disposed within the output shaft 154 wherein the threaded shaft is coupled to the drive shaft 136 with a locating pin 194.

Figure 3:
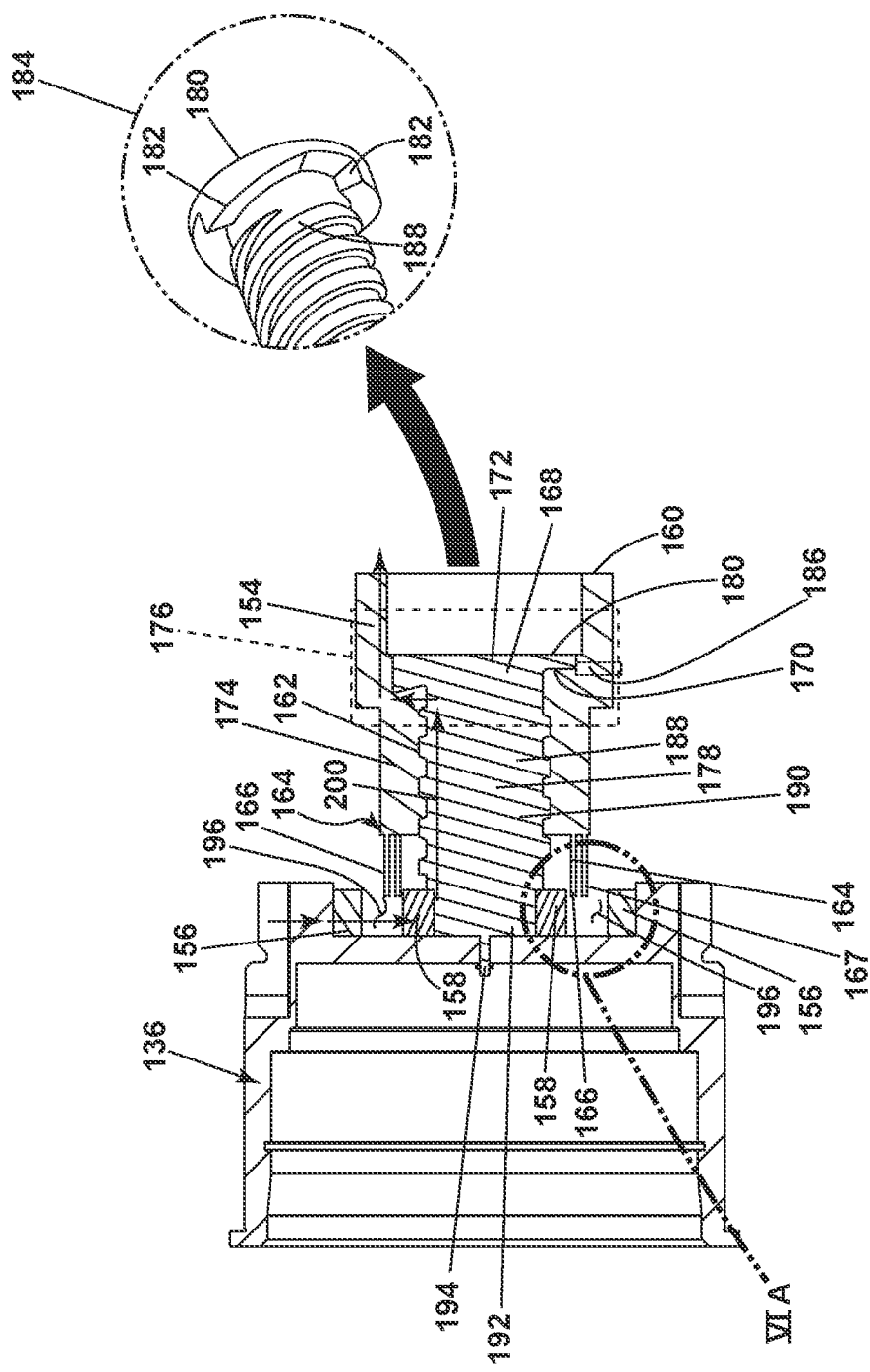
FIG. 3 is a cross-sectional view of a decoupler of FIG. 2 in a first position relative to the rotating shaft, in accordance with various aspects described herein.

FIG. 3 is a cross-sectional view of a decoupler assembly 150 in accordance with various aspects described herein in a first position 160. The output shaft 154 includes an internal threaded portion 162 which can be for example a three helical female thread. An annular ring 164 including a set of cylindrical thin films 166 can be disposed in a terminal end 167 of the output shaft 154 and located axially adjacent the drive shaft 136. The set of cylindrical thin films 166 can be a highly permeable magnetic material 167, including, but not limited to, a nickel iron soft magnetic alloy. The internal threaded portion 162 can terminate at an opposite end 168 of the annular ring 164 in a lip 170. The output shaft 154 can include an extruded wall portion 172 continuing axially beyond the lip 170. The output shaft 154 can define a member 174 moveable between the first position 160 and a second position 176.

The threaded shaft 178 includes a first end 180 with a set of stops 182 is located within the output shaft 154. The set of stops 182 can abut the lip 170. A call out 184 more clearly depicts the set of stops 182. The threaded shaft 178 can include a threaded portion 188 extending from the first end 180 to a second end 190 having an extruded solid portion 192 that terminates in the locating pin 194.

The second set of magnets 158 circumscribe and are mounted to the extruded solid portion 192 of the threaded shaft 178. A gap 196 is formed between the first set of magnets 156 and the second set of magnets 158. The first set of magnets 156 is located in a groove 198 formed in the drive shaft 136 circumscribing the gap 196 and the first set of magnets 156.

A retention mechanism, for example a shear pin 186, can connect the first end 180 of the threaded shaft 178 to the output shaft 154 at, for example, the extruded wall portion 172.

Figure 4:
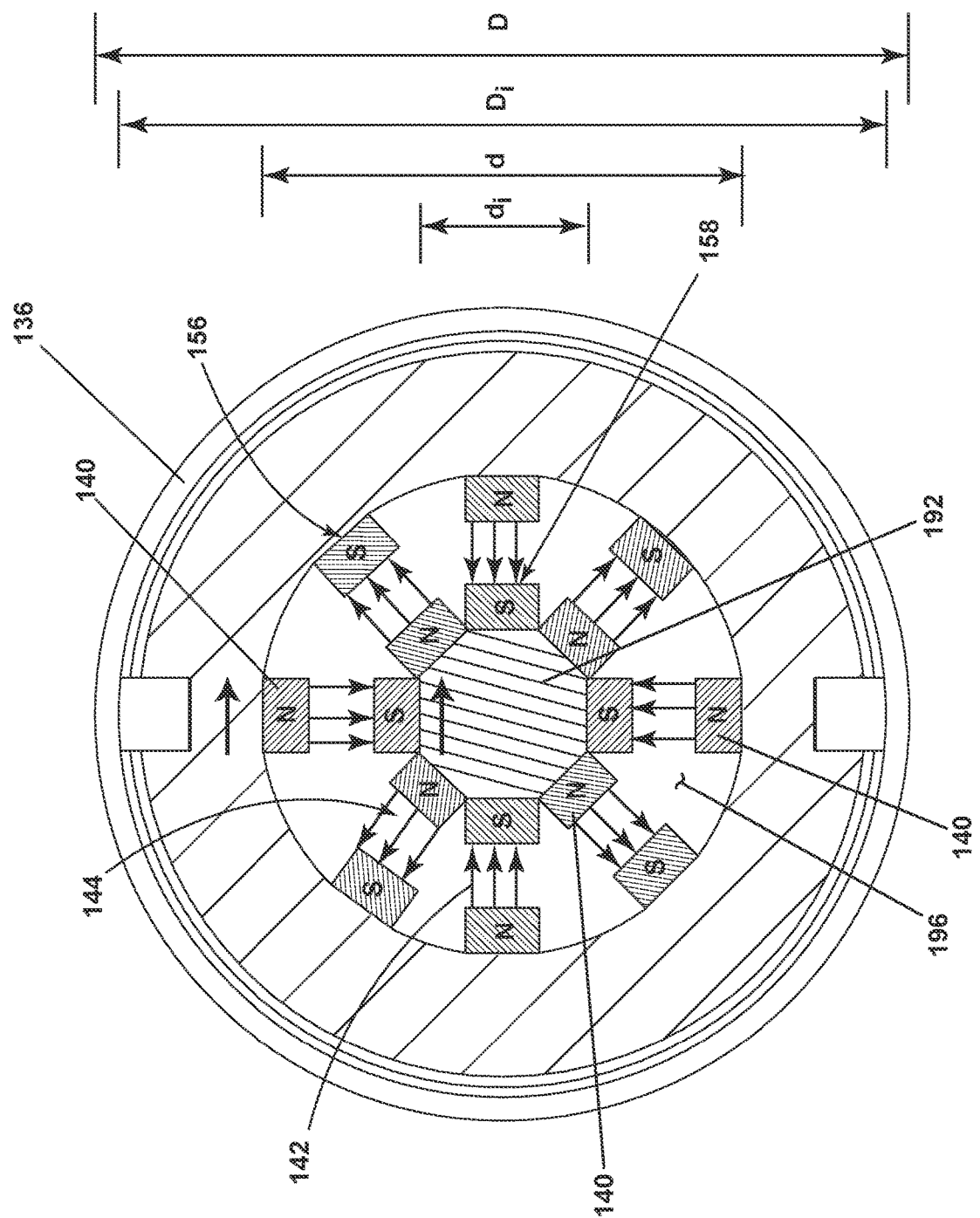
FIG. 4 is a cross-sectional view of an arrangement of magnets as part of the decoupler of FIG. 2, in accordance with various aspects described herein.

Turning to FIG. 4, an exemplary placement of the first and second set of magnets 156, 158 is illustrated. The first set of magnets 156 can include permanent magnets 140 having alternating poles N/S and arranged side by side along the groove 198 within the drive shaft 136. The second set of magnets 158 can include permanent magnets 140 arranged side by side and across from the first set of magnets 156 wherein each opposing magnet 140 is opposite in polarity with relationship to the first set of magnets 156. For example, when the permanent magnets 140 in the first set 156 are placed in a N/S/N/S arrangement, the permanent magnets 140 in the second set 158 are place in a S/N/S/N arrangement. It is also contemplated that each set of magnets 156, 158 can include axially arranged rows of magnets. The arrangements of magnets contemplated herein are for exemplary purposes and not meant to be limiting.

The first set of magnets 156 is arranged having an inner diameter $D_i$ and an outer diameter D, the second set of magnets 158 is arranged having an inner diameter $d_i$ and an outer diameter d. The opposite poles of the first and second sets of magnets 156, 158 produce a magnetic field having magnetic field lines 142 in the gap 196 ($D_i$-d) with a magnetic flux 144 proportional to the available space and torque transfer requirement of the air turbine starter 102. The arrangement of the first set and second set of magnets 156, 158 is such that first set of magnets 156 is spaced at a sufficient gap 196 ($D_i$-d) based on the aforementioned flux density needed.

Under normal operating conditions (the first position in FIG. 3) the clutch 132 is engaged and the air turbine starter 102 is driving the gas turbine engine 1. Torque is transmitted along a path 200 from the first set of magnets 156 to the second set of magnets 158 and then to the threaded shaft 178, which drives the output shaft 154 via the stops 182. In such an instance, the shear pin 186 and the threaded portion 188 are not loaded, while the set of stops 182 are loaded and provide the torque to drive the gas turbine engine 1.

When the clutch 132 becomes disengaged and the gas turbine engine 1 transmits an overrunning torque below a certain level to the air turbine starter 102, the set of stops 182 become unloaded while the shear pin 186 and threaded portion 188 become partially loaded.

Figure 5:
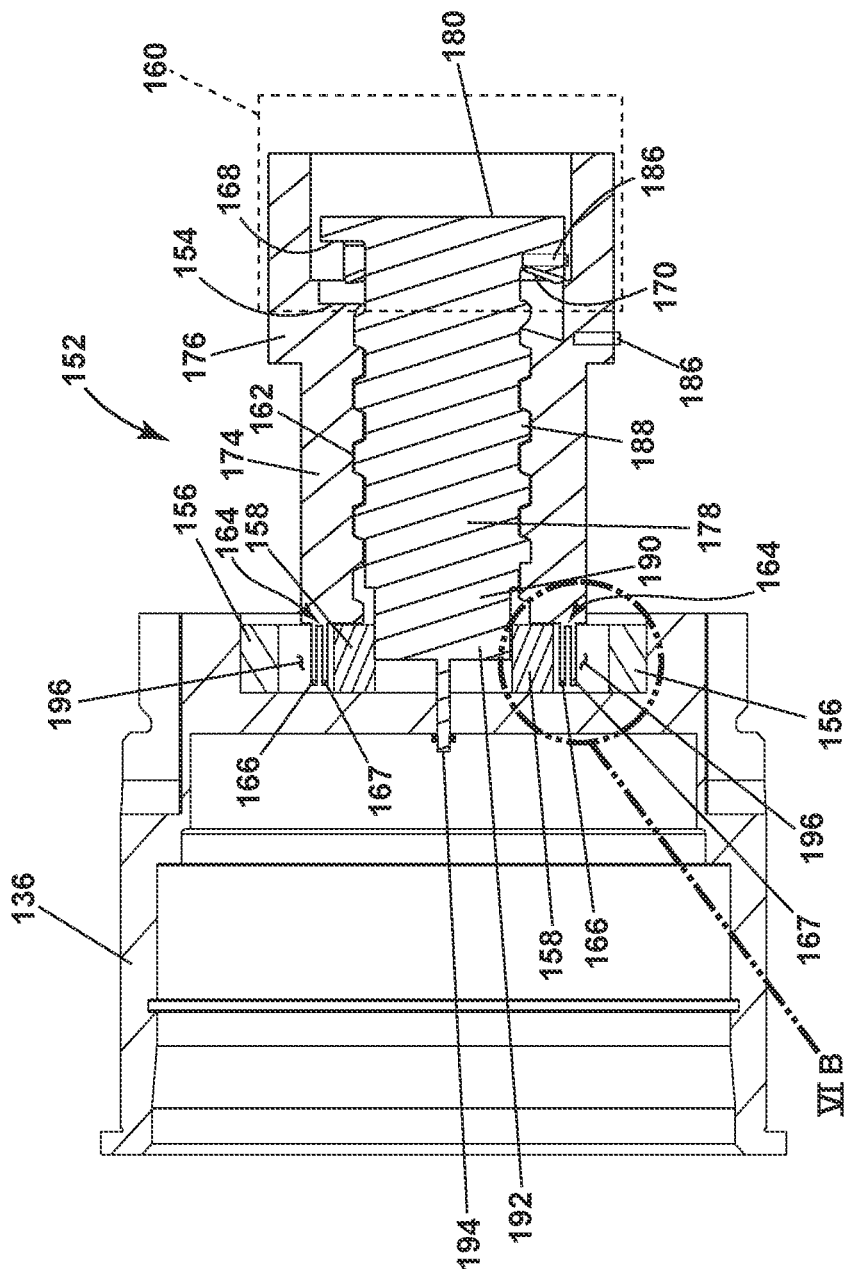
FIG. 5 is a cross-sectional view of the decoupler of FIG. 3 in a second position relative to the rotating shaft, in accordance with various aspects described herein.

Turning to FIG. 5, in the event of a backdrive, which can occur when the clutch 132 fails, the clutch 132 will become disengaged. Simultaneously the gas turbine engine 1 transmits an overrunning torque at or above a certain level to the air turbine starter 102 causing the shear pin 186 and threaded portion 188 to become fully loaded. In a fully loaded state, the shear pin 186 will shear and the helical threads of the threaded portion 188 between the output shaft 154 and threaded shaft 178 will be forcibly unwound so that the annular ring 164 of highly permeable material 167 moves into the gap 196.

Figure 6A:
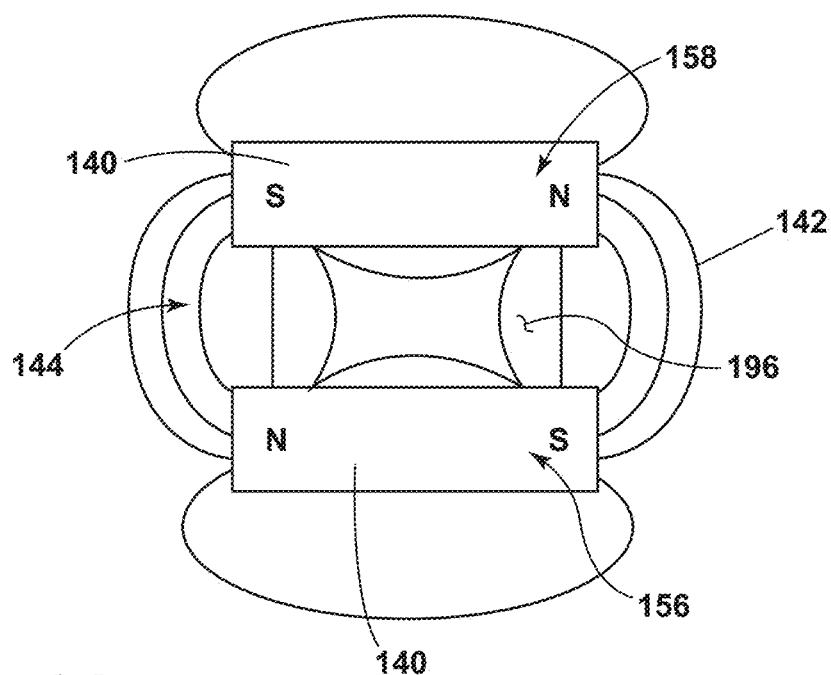
FIGS. 6A and 6B are schematic representations of two of the magnets from FIG. 4 at a position in FIG. 3 and FIG. 5
Figure 6B:
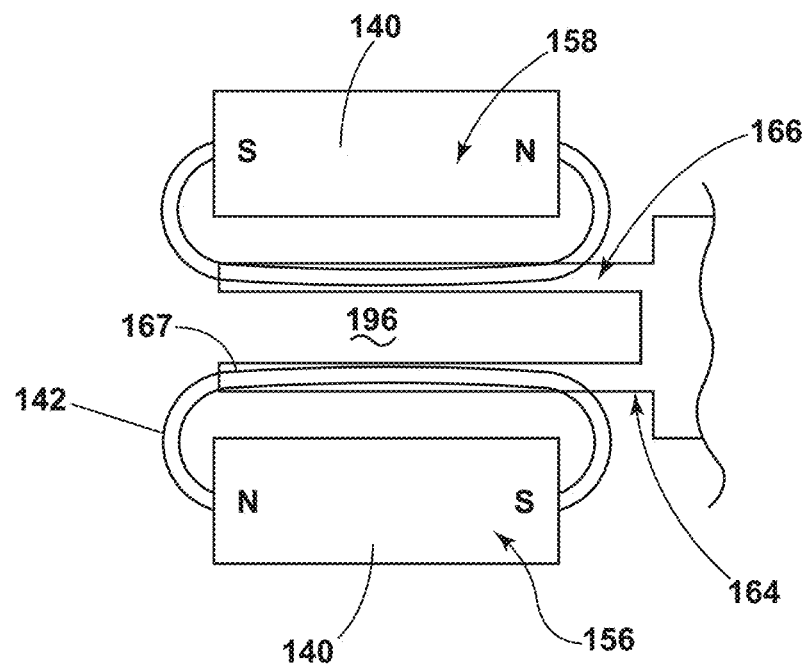

Turning to FIG. 6A, before the annular ring 164 moves into the gap 196, the magnetic flux 144 is present between the first and second sets of magnets 156, 158. When the annular ring 164 of highly permeable material 167 moves into the gap 196, the magnetic flux 144 is broken, such that magnetic field lines 142 are redirected through the highly permeable material layer 167 of the set of cylindrical thin films 166 leaving the gap 196 with little to no magnetic flux 144.

Turning to FIGS. 7, 8, 9, and 10, alternative examples of the decoupler assembly 150 are illustrated with like parts identified by like numerals increasing by 100, with it being understood that the description of the like parts of the various aspects described herein applies to the additional examples, unless otherwise noted.

Figure 7:
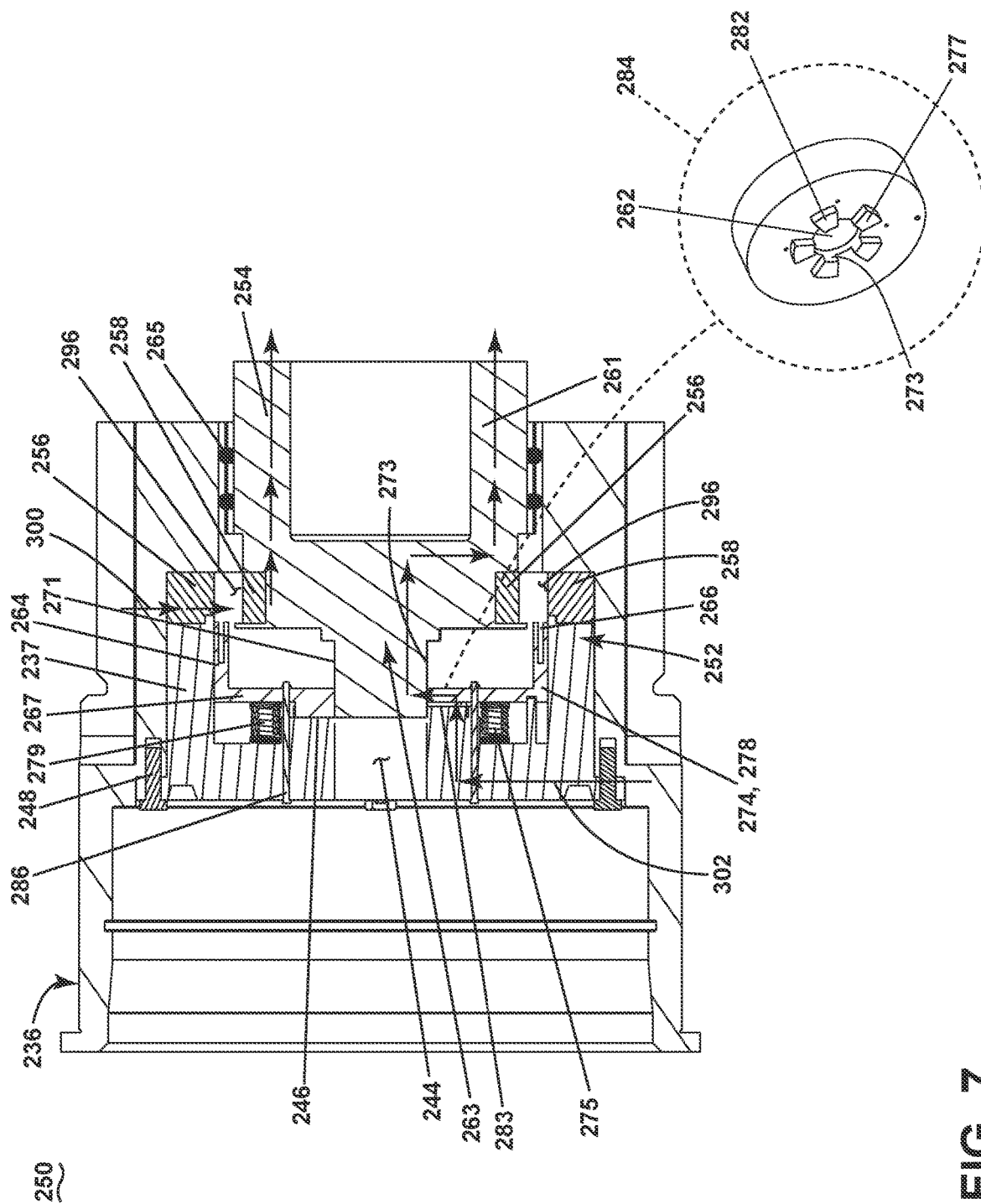
FIG. 7 is a cross-sectional view of a decoupler of FIG. 2 in a first position relative to the rotating shaft, in accordance with various aspects described herein.

FIG. 7 illustrates a decoupler assembly 250 in a first position 260. A drive shaft 236 circumscribes an intermediate shaft 237 with a hollow center portion 244 terminating in a first axial face 246 having a set of stops 282 in an annular arrangement. The intermediate shaft 237 is coupled to the drive shaft 236 with a suitable fastener 248, for example but not limited to a corresponding bolt and screw. A set of tensile pins 286, designed to fail under certain shear loads, pass through the intermediate shaft 237 to a moveable member 274.

A first portion 261 and a second portion 263 are included in the output shaft 254. The first portion 261 has a larger diameter than the diameter of the second portion 263. The first portion 261 is supported by a set of bearings 265 disposed between the drive shaft 236 and the output shaft 254 and the second portion 263 is slideably mounted to the moveable member 274 along a spline interface 271.

The moveable member 274 can be a connector shaft 278 that circumscribes the output shaft 254 and is circumscribed by the intermediate shaft 237. The connector shaft 278 can include annular walls 264 comprising a cylindrical thin film 266. The annular walls 264 can extend from a disc base 267 having an interior 262 that includes a corresponding spline interface 273. Additionally formed on the disc base 267 of the connector shaft 278 are a set of complementary stops 283 that are annularly arranged on a second axial face 277 confronting the first axial face 246.

The complementary shapes of the stops 282, 283 operably couple the intermediate shaft and therefore the drive shaft 136 to the connector shaft 278. A call out 284 more clearly depicts the stops 282. The complementary shapes of the spline and corresponding spline interfaces 271, 273 operably couple the connector shaft 278 to the output shaft 254 wherein the connector shaft 278 can slide along the second portion 263 of the output shaft 254.

A biasing member 275, for example but not limited to a set of springs 279 is mounted to the intermediate shaft 237 in a loaded position axially adjacent the disc base 267 of the connector shaft 278. The springs can be any type of compression spring. It should be understood that springs are an illustrative example of the biasing member 275 and are not meant to be limiting.

A gap 296 is maintained between a first and second set of magnets 256, 258, wherein the first and second set of magnets 256, 258 are arranged in the drive shaft 236 and output shaft 254, respectively.

Under normal operating conditions torque can be transferred along two distinct paths. For the first path 300, torque is transferred from the first set of magnets 256 to the second set of magnets 258 to drive the output shaft 254. A second path 302 is from the drive shaft 236 to the connector shaft 278 via the stops 282, 283 and the spline interfaces 271, 273. Regardless of the path along which torque is transferred, the set of tensile pins 286 are not loaded, while the set of stops 282, 283 and spline interfaces 271, 273 are loaded.

When the clutch 132 becomes disengaged and the gas turbine engine 1 transmits an overrunning torque below a certain level to the air turbine starter 102, the set of stops 282, 283 and spline interfaces 271, 273 become unloaded while the tensile pins 286 becomes partially loaded.

Figure 8:
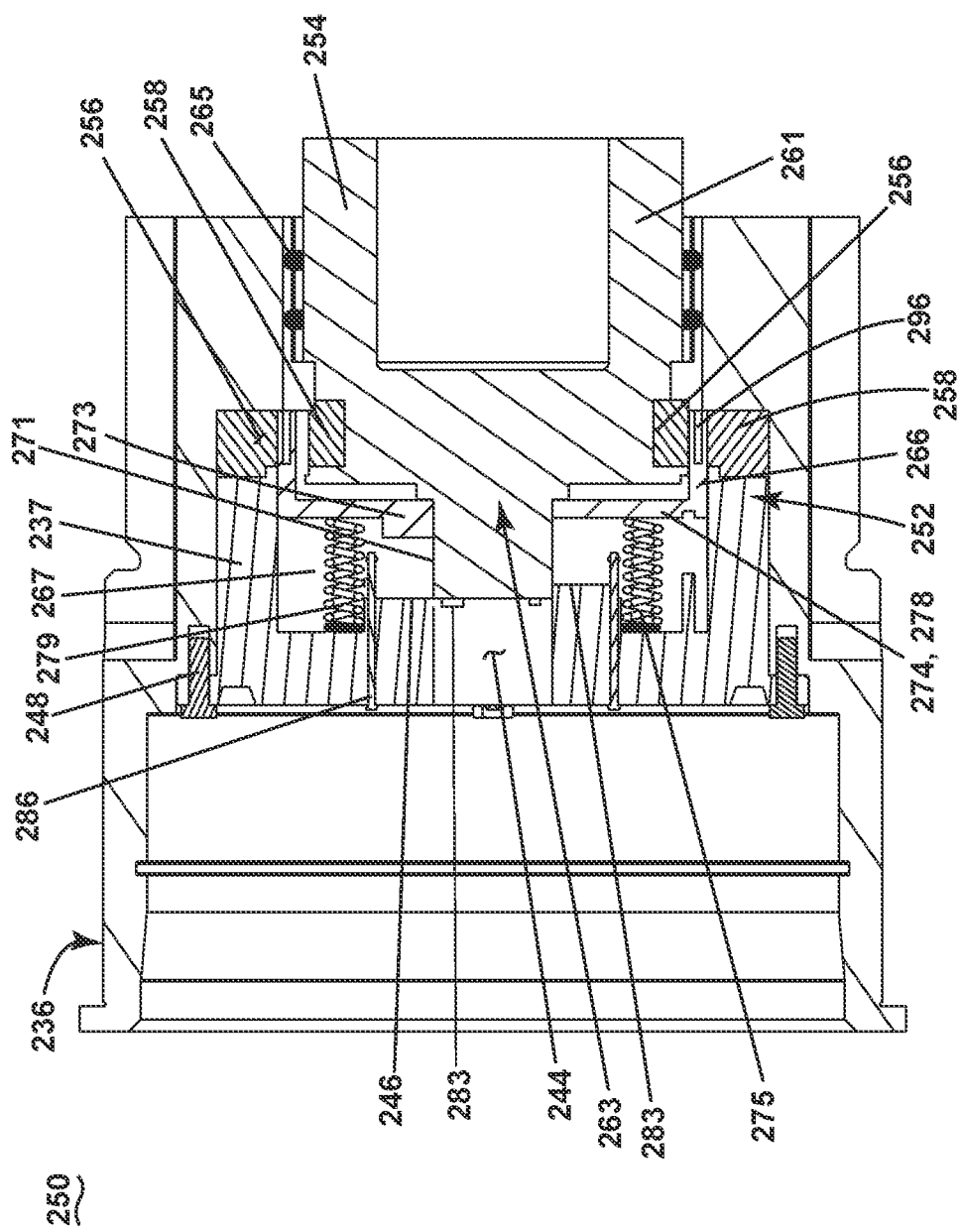
FIG. 8 is a cross-sectional view of the decoupler of FIG. 5 in a second position relative to the rotating shaft, in accordance with various aspects described herein.

Turning to FIG. 8, in the event of a backdrive, when the gas turbine engine 1 transmits an overrunning torque at or above a certain level to the air turbine starter 102 the tensile pin 286 becomes fully loaded under shear stress due to backdrive torque. In a fully loaded state the tensile pin 286 will shear off eliminating compression forces on the set of springs 279 so that the set of springs 279 expands and pushes the connector shaft 278 axially away from the intermediate shaft 237 toward the output shaft 254. The annular walls 264 of highly permeable material move into the gap 296 breaking the magnetic flux present between the first and second sets of magnets 256, 258, such that the magnetic field lines 242 are redirected into highly permeable material 266 as previously described herein.

Figure 9:
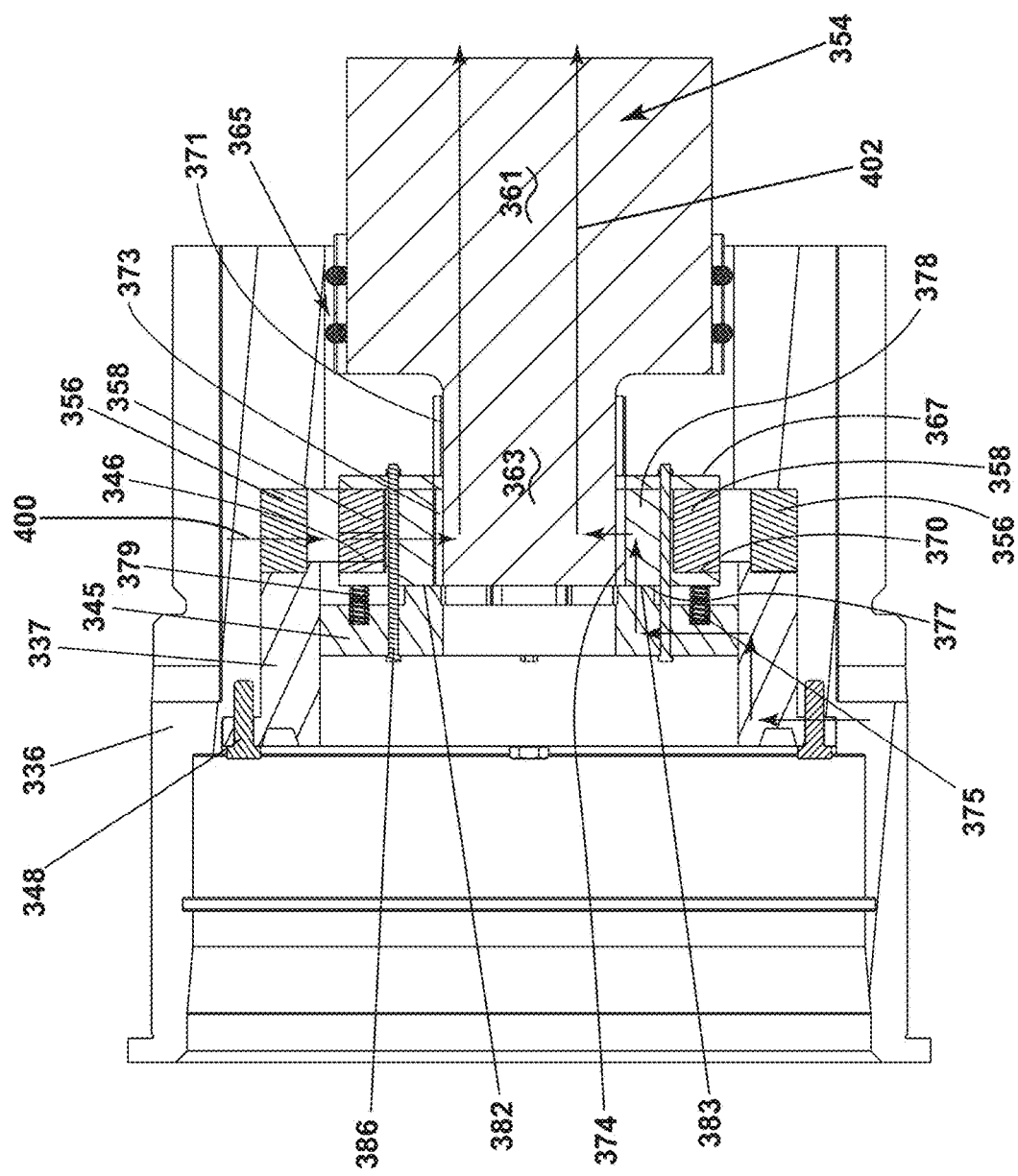
FIG. 9 is a cross-sectional view of a decoupler of FIG. 2 in a first position relative to the rotating shaft, in accordance with various aspects described herein.

FIG. 9 illustrates a decoupler assembly 350 in a first position. A drive shaft 336 circumscribes an intermediate shaft 337. The intermediate shaft 337 includes an annular disc 345 having a first axial face 346 upon which a set of stops 382 is arranged. A set of tensile pins 386 pass through the annular disc 345 and through a moveable member 374.

The set of tensile pins 386 can be secured with a suitable fastening device 348, for example but not limited to a washer-nut assembly.

The moveable member 374 can be a coupling mechanism 378 slideably mounted to an output shaft 354 having a spline interface 371. The coupling mechanism 378 includes an annular spline interface 373 and a second axial face 377 upon which a complementary set of stops 383 is arranged. The coupling mechanism 378 can include an annular lip 370 and an annular face plate 367 for securing the set of tensile pins 386 with a fastener such as for example but not limited to a bolt and screw.

A set of springs 379 are arranged between the annular disc 345 in a compressed position axially adjacent the lip 370 of the coupling mechanism 378. The springs can be any type of biasing mechanism, for example but not limited to a compression spring.

A gap 396 is maintained between a first and second set of magnets 356, 358, wherein the first and second set of magnets 356, 358 are arranged in the drive shaft 336 and output shaft 354 respectively. The second set of magnets 358 is circumferentially mounted to the coupling mechanism 378 and arranged between the lip 370 and annular face plate 367.

The complementary shapes of the stops 382, 383 operably couple the intermediate shaft 337 and therefore the drive shaft 336 to the coupling mechanism 378. The complementary shapes of the spline interface 371 and annular spline interface 373 operably couple the coupling mechanism 378 to the output shaft 354 such that the coupling mechanism 378 can slide along the second portion 363 of the output shaft 354.

Under normal operating conditions torque can be transferred again along two distinct paths. A first path 400 is like the first and second embodiments, in that torque is transferred from the first set of magnets 356 to the second set of magnets 358 to drive the output shaft 354. A second path 402 is illustrated with arrows showing that torque is transferred from the drive shaft 336 to the coupling mechanism 378 via the stops 382, 383 and the spline interfaces 371, 373.

Under normal operating conditions the tensile pins 386 are not loaded. When the clutch 332 becomes disengaged so that an overrunning torque below a certain level is transmitted, the set of stops 382, 383 and spline interfaces 371, 373 become unloaded while the tensile pin 386 becomes partially loaded. It should be understood that the stops 182, 282, 283, 382, 383 and spline interfaces 271, 273, 371, 373 between the drive shaft, member, and output shaft described herein are for exemplary purposes only and not meant to be limiting.

Figure 10:
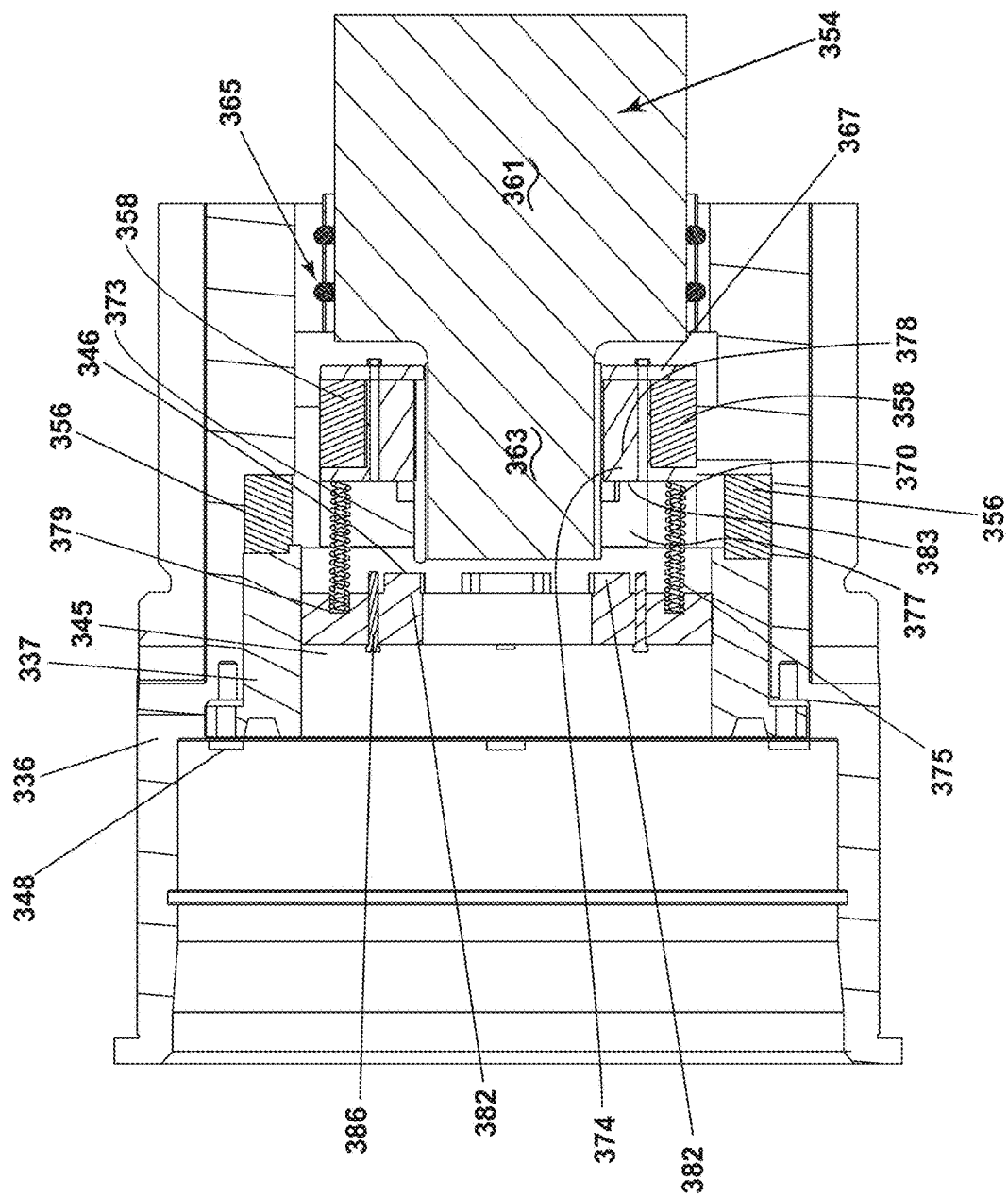
FIG. 10 is a cross-sectional view of the decoupler of FIG. 7 in a second position relative to the rotating shaft, in accordance with various aspects described herein.

In the event of a backdrive, the tensile pins 386 become fully loaded. In a fully loaded state the tensile pins 386 will break eliminating compression forces on the set of springs 379 so that the set of springs 279 expands and pushes the coupling mechanism 378 axially away from the intermediate shaft 337 toward the output shaft 354 as illustrated in FIG. 10. The corresponding second set of magnets 358 circumscribing the coupling mechanism 378 will also move axially away from the first set of magnets 356 weakening the magnetic flux between the first and second set of magnets 356, 358.

Figure 11:
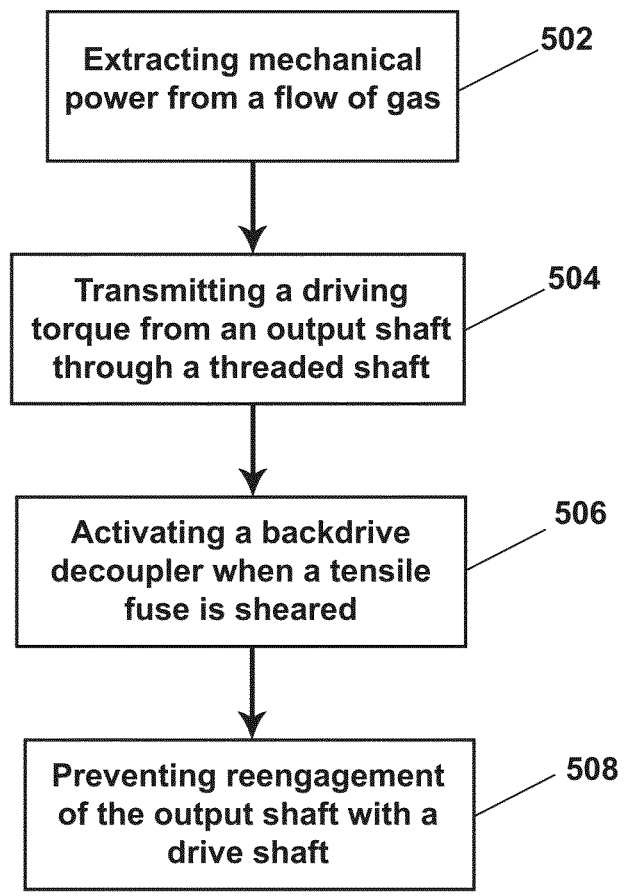
FIG. 11 is a flow chart of a method for operating an air turbine starter.

FIG. 11 depicts a flow chart for a method 500 for operating the air turbine starter 102 as discussed herein. At 502 mechanical power is extracted from a flow of gas utilizing the turbine member 116 to drive the gear train 118 and clutch 132 with the drive shaft 136 including the first set of magnets 156. At 504, a driving torque is transferred from the drive shaft 136 to the output shaft 154 with the second set of magnets 158 operably coupled to the output shaft 154, and where the output shaft 154 is operably coupled to the engine 1. The driving torque in method 500 is transmitted from the drive shaft 136 of the clutch 132 to the output shaft 154 through the magnetic flux created by the first set of magnets 156 and the second set of magnets 158.

At 506, during backdriving, the member 174 is moved to the second position 176 wherein the member 174 decouples the magnetic flux between the first set of magnets 156 and the second set of magnets 158. During backdriving, the member 174 moves to the second position 176 in order to weaken the magnetic flux between the drive shaft 136 and output shaft 154 by redirecting the magnetic field lines 142 and in turn uncoupling torque transfer between the drive shaft 136 and the output shaft 154 to define a decoupled position where the output shaft 154 is disengaged from the gear train 118.

All directional references (e.g., radial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto can vary.

Many other possible embodiments and configurations in addition to that shown in the above figures are contemplated by the present disclosure. Additionally, the design and placement of the various components such as starter, AGB, or components thereof can be rearranged such that a number of different in-line configurations could be realized.

The aspects of the present disclosure provide a decoupler for decoupling a torque load coming from the gear train of an engine to prevent backdriving of the entire air turbine starter. Benefits associated with this decoupling include reducing the risk of spinning a damaged air turbine starter which could cause additional damage to the air turbine starter if not decoupled.

Technical benefits associated with providing permanent magnets in an air turbine starter for transferring torque along with a mechanism to break the magnetic flux used to transfer the torque in a backdrive event include preventing undesirable back-driving of starter, which in turn allows for a lowering of repair and maintenance costs. The impulse created from a traditional mechanical torque transfer mechanism is reduced by implementing a magnetic torque transfer mechanism. The use of magnets is smoother and reduces undesirable vibrations in the engine.

To the extent not already described, the different features and structures of the various embodiments can be used in combination with each other as desired. That one feature cannot be illustrated in all of the embodiments is not meant to be construed that it cannot be, but is done for brevity of description. Thus, the various features of the different embodiments can be mixed and matched as desired to form new embodiments, whether or not the new embodiments are expressly described. Moreover, while "a set of" various elements have been described, it will be understood that "a set" can include any number of the respective elements, including only one element. Combinations or permutations of features described herein are covered by this disclosure.

This written description uses examples to disclose embodiments of the invention, including the best mode, and also to enable any person skilled in the art to practice embodiments of the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An air turbine starter for starting an engine, comprising:
   a housing defining an inlet, an outlet, and a flow path extending between the inlet and the outlet for communicating a flow of gas therethrough;
   a turbine member journaled within the housing and disposed within the flow path for rotatably extracting mechanical power from the flow of gas;
   a gear train drivingly coupled with the turbine member;
   a clutch having a drive shaft that is operably coupled with the gear train;
   an intermediate shaft coupled to and circumscribed by the drive shaft;
   an output shaft configured to be operably coupled to and rotate with the engine; and
   a backdrive decoupler, comprising:
      a first set of magnets operably coupled to the intermediate shaft;
      a second set of magnets, operably coupled to the output shaft;
      a moveable member moveable between a first position and a second position; and
      a biasing member compressed between the intermediate shaft and the moveable member when the moveable member is in the first position;
      wherein movement of the moveable member breaks a flux between the first set of magnets and the second set of magnets;
   wherein driving torque is transmitted from the drive shaft of the clutch to the output shaft through magnetic field lines created between the first set of magnets and the second set of magnets, when overrunning torque is transmitted the moveable member moves to the second position and is configured to break the magnetic flux between the intermediate shaft and the output shaft thereby uncoupling torque transfer between the drive shaft and the output shaft to define a decoupled position where the output shaft is disengaged from the gear train.

2. The air turbine starter of claim 1 wherein the moveable member comprises a magnetic material.

3. The air turbine starter of claim 2 wherein the magnetic flux is redirected through the magnetic material.

4. The air turbine starter of claim 1 wherein the first set of magnets comprises alternating poles.

5. The air turbine starter of claim 1 wherein the moveable member is operably coupled to the output shaft.

6. The air turbine starter of claim 5 wherein the moveable member is a coupling mechanism slidably mounted to the output shaft.

7. The air turbine starter of claim 1, wherein the biasing member is configured to move the moveable member to the second position.

8. The air turbine starter of claim 7, wherein the second set of magnets is coupled to the moveable member so when the moveable member is moved to the second position the magnetic field lines are weakened.

9. The air turbine starter of claim 1, wherein the biasing member is a set of springs.

10. The air turbine starter of claim 1 wherein the moveable member is a connector shaft that circumscribes the output shaft and the connector shaft is circumscribed by the intermediate shaft.

11. The air turbine starter of claim 10 wherein a gap is located between the first set of magnets and the second set of magnets and the connector shaft fills at least a portion of the gap when the connector shaft is in the second position.

12. The air turbine starter of claim 11 wherein the connector shaft includes a set of cylindrical thin films that move axially.

13. A decoupler assembly for decoupling an output shaft from a drive shaft during backdrive, comprising:
 a first set of magnets operably coupled to the drive shaft;
 a second set of magnets operably coupled to the output shaft; and
 a connector shaft comprising an annular ring, the connector shaft movable between a first position and a second position, wherein a gap is formed between the first set of magnets and the second set of magnets when the connector shaft is in the first position and movement of the connector shaft toward the second position fills at least a portion of the gap with the annular ring breaking a magnetic flux between the first set of magnets and the second set of magnets; and
 wherein driving torque is transmitted from the drive shaft to the output shaft through the magnetic flux created by the first set of magnets and second set of magnets, when overrunning torque is transmitted the connector shaft moves to the second position and is configured to break magnetic field lines between the drive shaft and the output shaft thereby uncoupling torque transfer between the drive shaft and the output shaft to define a decoupled position where the output shaft is disengaged from a gear train.

14. The decoupler assembly of claim 13, further comprising a biasing member configured to move the connector shaft to the second position.

15. The decoupler assembly claim 14 further comprising an intermediate shaft coupled to and circumscribed by the drive shaft and the biasing member is a set of springs that is compressed between the intermediate shaft and the connector shaft.

16. The decoupler assembly of claim 13, further comprising a shear pin that retains the connector shaft in the first position.

17. The decoupler assembly of claim 13 wherein the magnetic flux is redirected through a portion of the connector shaft made from a magnetic material.

18. The decoupler assembly of claim 13 wherein the connector shaft is a threaded shaft operably coupled to the output shaft.

19. A method for operating an air turbine starter, comprising:
 extracting mechanical power from a flow of gas utilizing a turbine and driving a gear train and clutch having a drive shaft with a first set of magnets operably coupled thereto therewith;
 transferring a driving torque from the drive shaft to an output shaft having a second set of magnets spaced from the first set of magnets to define a gap, opposite in polarity to the first set of magnets, operably coupled to the output shaft, and where the output shaft is operably coupled to an engine; and
 during back driving:
  moving a member comprising an annular ring to a position wherein the member fills at least a portion of the gap breaking a magnetic flux between the first set of magnets and the second set of magnets; and
  redirecting magnetic field lines through the annular ring;
 wherein driving torque is transmitted from the drive shaft of the clutch to the output shaft through the magnetic flux created by the first set of magnets and the second set of magnets, when overrunning torque is transmitted the member moves to the position to weaken the magnetic flux between the drive shaft and the output shaft by uncoupling torque transfer between the drive shaft and the output shaft to define a decoupled position where the output shaft is disengaged from the gear train.

20. The method of claim 19 wherein moving the member comprises unloading a biasing member and pushing the annular ring into the gap.

* * * * *